(12) United States Patent
Masuo

(10) Patent No.: US 6,421,316 B1
(45) Date of Patent: Jul. 16, 2002

(54) POINT-TO-MULTIPOINT CONNECTION RESTORATION

(75) Inventor: Hitoshi Masuo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/118,861

(22) Filed: Jul. 20, 1998

(51) Int. Cl.⁷ .............................................. H04L 12/56
(52) U.S. Cl. ...................................... 370/216; 370/225
(58) Field of Search .................................. 370/216, 242, 370/312, 390, 432, 225, 217, 218, 221; 714/102; 340/827

(56) References Cited

U.S. PATENT DOCUMENTS 5,627,821 A  *  5/1997  Miyagi ........................ 370/242
5,805,578 A  *  9/1998  Stirpe et al. ................. 370/255
5,831,975 A  * 11/1998  Chen et al. .................. 370/256
6,026,077 A  * 12/2000  Iwata ........................... 370/254

OTHER PUBLICATIONS

E.M. Spiegel et al., "Procedures for Fast Connection Recovery in PNNI Networks", pp. 1–17, ATM Forum/97–0632, Jul. 1997.

D.M. Kushi et al., "Signalling Procedures for Fault Tolerant Connections", pp. 1–19, ATM Forum/97–0391R1, Apr. 1997.

Support for Leaf Initiated Join in PNNI, pp. 1–31, ATM Forum 96–1401R3, Jul. 1997.

* cited by examiner

*Primary Examiner*—Douglas Olms
*Assistant Examiner*—Ken Vanderpuye
(74) *Attorney, Agent, or Firm*—Young & Thompson

(57) ABSTRACT

In Network LIJ point-to-multipoint connection, when an endpoint node receives a connection release message caused by a fault of the network from the root terminal side after a leaf initiated connection to a leaf terminal has been established, the leaf initiated connection is maintained and then a second connection request message is sent to the network to wait for a connection message for restoration to be received from the network in response to the second connection request message. A route is switched by connecting the leaf initiated connection to a restored connection determined by the connection message for restoration.

18 Claims, 10 Drawing Sheets

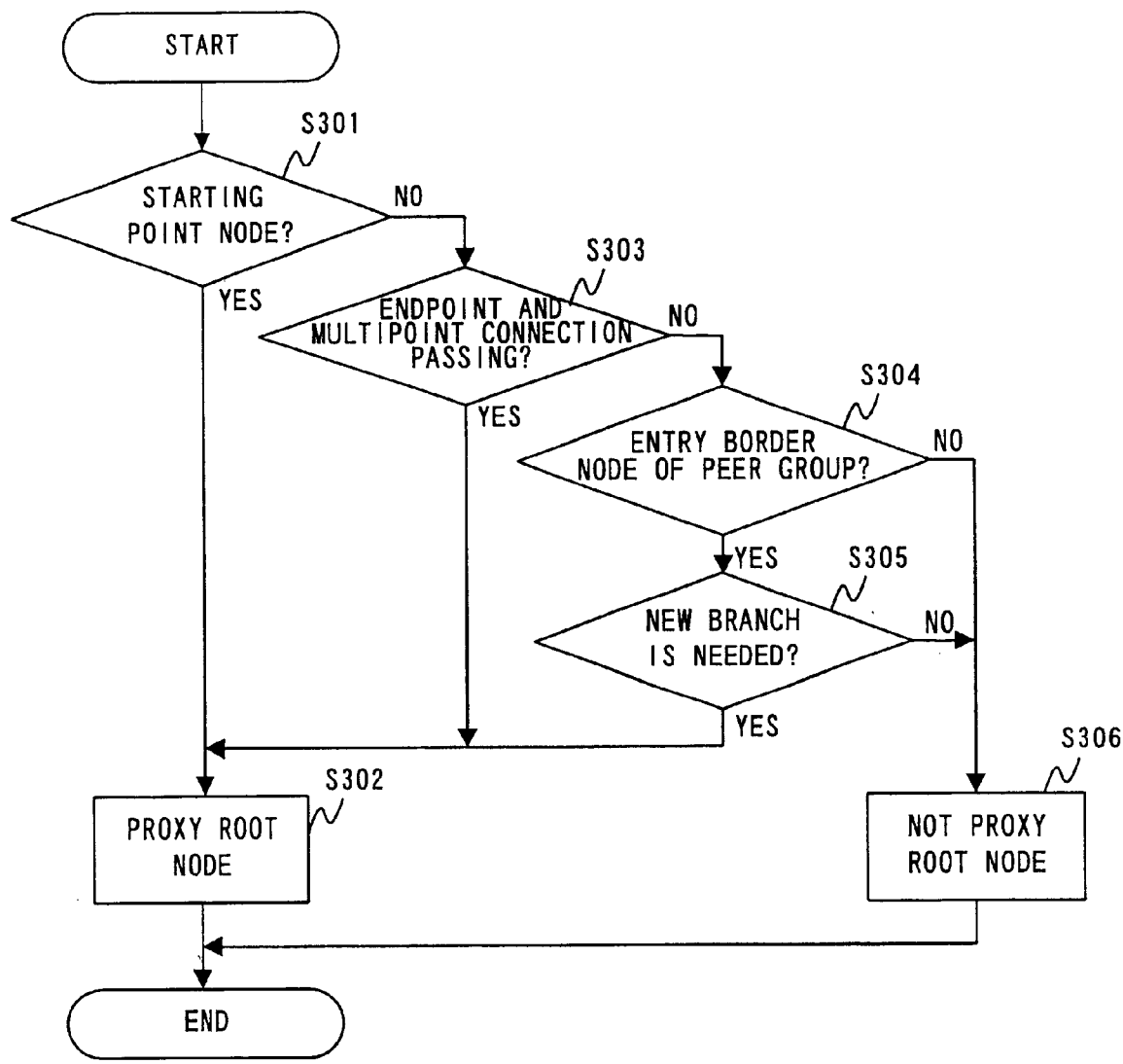

POINT-TO-MULTIPOINT CONNECTION RESTORATION

BACKGROUND OF THE INVENTION

1. Field of the Invention

The present invention generally relates to connection restoration in connection-oriented network, and in particular to a method and system which are capable of restoring a point-to-multipoint connection when a fault occurs thereon.

2. Description of the Related Art

A typical example of connection-oriented network where a connection is established according to the source-routing scheme computing a route based on network topology information exchanged between nodes is ATM (asynchronous transfer mode) network. In the ATM network, restoration is conventionally performed taking into account only the case of a point-to-point connection.

In the standardization work done with ATM Forum, the fault recovery techniques of such a point-to-point connection have been proposed by David M. Kushi and Ethan M. Spiegel (AF/97-0391R1 "Signalling Procedures for Fault Tolerant Connections" ATM Forum, Apr. 27, 1997, pp.13–18, and AF/97-0632 "Procedures for Fast Connection Recovery in PNNI Networks" ATM Forum and Jul. 21, 1997 pp.9–17). As a first example, in a network configuration where a source terminal is connected to a node and a destination terminal is connected to another node, these nodes perform connection switching when receiving a message indicating fault occurrence. In a second example, in a network which is logically layered and managed, a logical layer is determined depending on a fault situation and the ingress and egress nodes of the logical layer perform connection switching.

The point-to-multipoint connection techniques has been proposed by Ted Tedijanto et al. in the ATM forum (AF/96-140lR3 "Support for Leaf Initiated Join in PNNI" ATM Forum Jul. 21, 1997 pp.2–30). The point multi-point connection is directed to a connection technique which allows concurrent transmission of data from a single source terminal (hereinafter called a root terminal) to two or more destination terminals (hereinafter called leaf terminals). Some methods are proposed to the point-to-multipoint connection technique.

A basic method is that the root terminal establishes a connection to every leaf terminal. More specifically, the root terminal transmits a SETUP message to a first leaf terminal which is to be initially connected. Thereafter, the root terminal transmits an ADD_PARTY message to a second leaf terminal and the ADD_PARTY message travels over the initial connection to a node at which the initial connection branches to the second leaf terminal. Then, a SETUP message is transmitted from the branching node to the second leaf terminal to establish the connection to the second leaf terminal. In this manner, the point-to-multipoint connection is established.

According to the basic setup method, however, the amount of management information increases with an increase in the number of leaf terminals, resulting in the increasing burden on the root terminal. To reduce the burden on the root terminal, there has been proposed a connection method called Network LIJ (Leaf Initiated Join).

In the Network LIJ connection method, after the connection has been established between the root terminal and the first leaf terminal, a connection request received from a second leaf terminal causes the connection to be established by a proxy root node rather than the root terminal. In other words, nodes including the root terminal upstairs (i.e. in the direction of the root terminal) from the proxy root node have no awareness of the second leaf terminal. It is the same with other leaf terminals.

More specifically, the root terminal sends a SETUP message to the first leaf terminal only when the connection to the first leaf terminal is established. When a point-to-multipoint connection is requested by the second leaf terminal, the second leaf terminal sends a LEAF SETUP REQUEST message to the network. The LEAF SETUP REQUEST message is received by an immediate node (hereinafter called a endpoint node) which is directly connected to the second leaf terminal. When receiving the LEAF SETUP REQUEST message, the endpoint node computes a route to the root terminal to sent it according to the computed route. For each leaf terminal on the Network LIJ connection, a node that initially responds to the LEAF SETUP REQUEST message is determined which is hereinafter referred to as a proxy root node. The proxy root node performs connection setup and management as a substitute for the root terminal. When receiving the LEAF SETUP REQUEST message, the proxy root node sends a SETUP MESSAGE or an ADD PART message to the second leaf terminal to perform the point-to-multipoint connection.

Therefore, no message for connection establishment is sent to nodes upstream from the proxy root node. Since the root terminal has no need to manage leaf terminals other then the first leaf terminal, the burden on the root terminal is dramatically reduced as a result.

However, a conventional restoration method is applied only to the point-to-point connection and the same restoration method cannot be applied to the point-to-multipoint connection. Since a proxy root node sets up a new connection without the intervention of the root endpoint nodes upstream from the proxy root node do not manage the connection. Therefore, when a fault occurs between the root terminal and the proxy root node, neither the proxy root node nor the root node manages the fault connection segment.

Further, there are cases where a plurality of SETUP messages are generated to restore the point-to-multipoint connection when a fault occurs. In this case, it is necessary to determine which message should be selected. For this, there is proposed a method that SETUP messages are numbered in sequence by the nodes and a SETUP message having the latest serial number is selected and used to restore the connection. In the case of point-to-point connection, there is no problem because the root node controls the entire point-to-point connection. However, in the case of Network LIJ point-to-multipoint connection, when a fault occurs between the root terminal and the proxy root node, it is very difficult to manage the serial numbers given to the SETUP messages.

SUMMARY OF THE INVENTION

An object of the present invention is to provide a connection restoration method and system which can achieve automatic fault recovery when a fault occurs in point-to-multipoint connection configuration.

Another object of the present invention is to provide a connection restoration method and system which can achieve automatic fault recovery with simplified procedures when a fault occurs in Network LIJ point-to-multipoint connection.

According to an aspect of the present invention, in a connection-oriented network where a point-to-multipoint connection is formed between a terminal which is a sending side of the connection (hereinafter, called root terminal) and a plurality of terminals which are a receiving side of the connection (hereinafter, called leaf terminal) through a plurality of nodes of the network and the point-to-multipoint connection is established and managed in the network without only dependence on the root terminal, at a first node of the nodes, it is determined whether a connection release message caused by a fault of the network is received from root terminal side after a first connection to a leaf terminal has been established in response to a first connection request message received from the leaf terminal. When the connection release message is received from the root terminal side, the first connection to the leaf terminal is maintained. Thereafter, a second connection request message is sent to the network to wait for a connection message for restoration to be received from the network in response to the second connection request message. And a route is switched by connecting the first connection to a second connection determined by the connection message for restoration received from the network.

Further, at a second node located upstream from the first node, it is determined whether the connection release message caused by the fault is received from leaf terminal side and, when the connection release message is received from the leaf terminal side, a third connection to the root terminal is maintained. Thereafter, the connection message for restoration is sent to the leaf terminal side when receiving the second connection request message from the first node, and a route is switched by connecting the third connection to the second connection determined by the connection message for restoration after the second connection has been established.

According to another aspect of the present invention, in a connection-orientated network wherein a point-to-multipoint connection is formed between a terminal which is a sending side of the connection (hereinafter, called root terminal) and a plurality of terminals which are a receiving side of the connection (hereinafter, called leaf terminal) through a plurality of nodes of the network, wherein the point-to-multipoint connection is established and managed by at least one node (hereinafter, called proxy root node) which is determined according to a predetermined procedure, a first connection from a proxy root node affected by a fault of the network to the root terminal is maintained when the fault is detected in the point-to-multi-point connection and a second connection from an endpoint node to the leaf terminal is also maintained, wherein the endpoint node is directly connected to a leaf terminal affected by the fault. In response to a connection request sent by the endpoint node, an alternate route between the proxy root node affected by the fault and the endpoint node is established, and the alternate route is connected to the first connection and the second connection at the proxy root node and the endpoint node, respectively.

BRIEF DESCRIPTION OF THE DRAWINGS

FIG. 3 is a flowchart showing a procedure for determining whether each node is a proxy root node in the embodiment;

DETAILED DESCRIPTION OF THE PREFERRED EMBODIMENT

A network using PNNI (Private Network—Network Interface) protocol determined by ATM Forum will be taken as an example of connection-oriented network. The PNNI protocol relates to routing technique for exchanging network topology information such as the connection state of the network and the use state of network resource and signaling technique for establishing connections in the network. First, the network configurations using the PNNI protocol will be described hereinafter.

Figure 1:
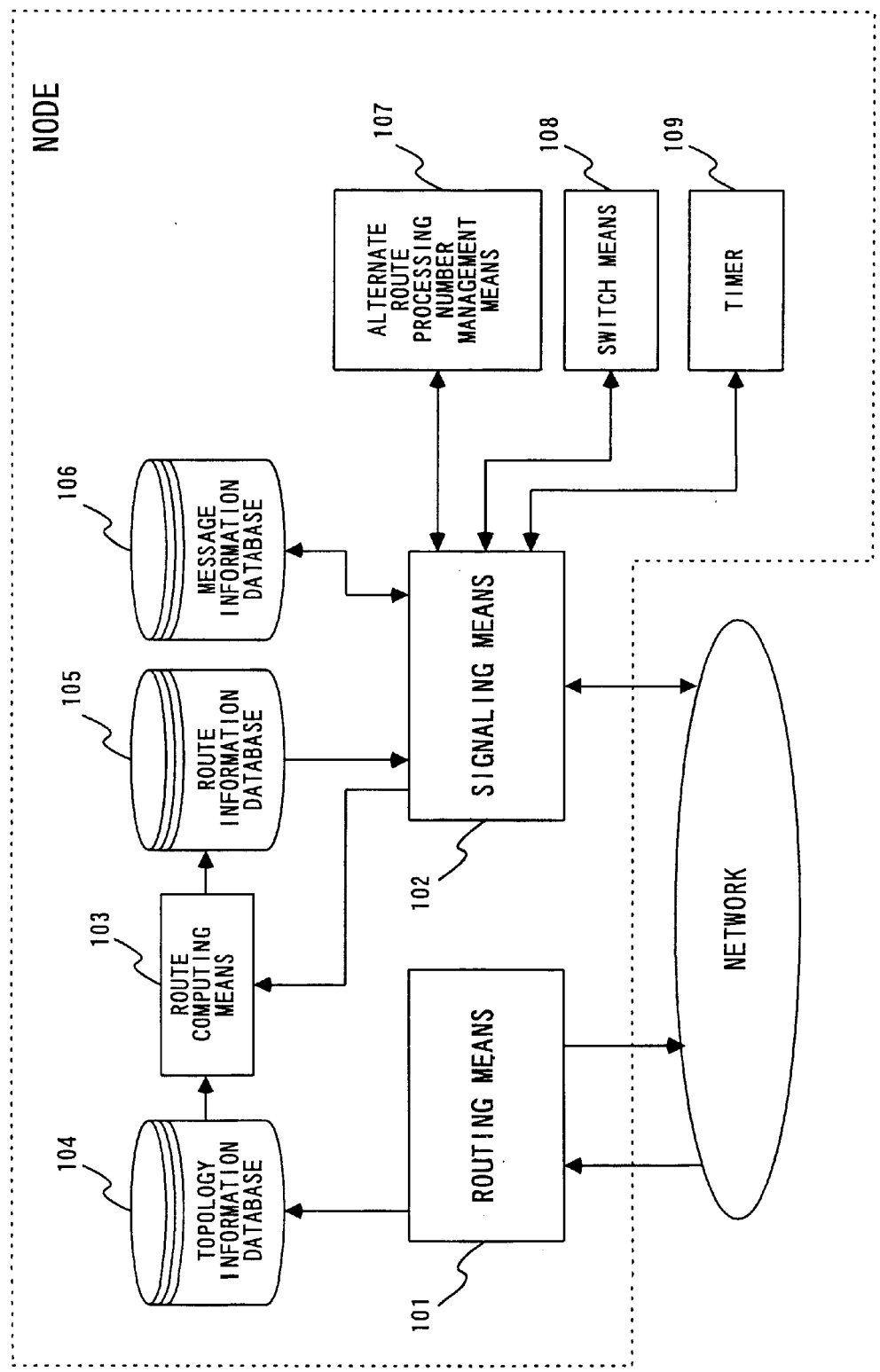
FIG. 1 is a block diagram showing the functional configuration of a node according to an embodiment of the present invention.

Referring to FIG. 1, a plurality of modes are connected to form the network, each comprising a routing means 101, a signaling means 102 and a route computing means 103. These functions may be implemented with a data processor running respective programs corresponding thereto.

The routing means 101 uses the protocol of the same specification as the PNNI routing protocol provided in ATM Forum. The routing means 101 exchanges network topology information by sending and receiving messages for routing to and from neighboring nodes. When receiving network topology information from the neighboring node, the routing means 101 determines whether it is different from that stored in a topology information database 104 and, if it is determined that the network topology information should be changed, the topology information database 104 is updated. Further, when it is determined that received topology information should be transferred to other nodes, the routing means 101 sends it to the neighboring nodes. Such a topology information flowing operation is called 'flooding'.

The operation of the signaling means 102 are largely classified into two operations. One is leaf initiated connection establishment/release process and another one is connection release/re-establishment process caused by network fault to which the present invention relates. These processes vary in function depending on the role of a node in the network, that is, the position of the node in the network: starting point node, endpoint node, traversed node or proxy root node.

The root computing means 103 computes a route by using the address of a leaf terminal and the network topology information stored in the topology information data base 104 as described later. As an example of the route computation method, the well-known Dijkstra algorithm for calculating the shortest route may be used. The computed route information is stored onto a route information database 105. Moreover, the signaling means 102 is connected to message information database 106, alternate route processing number management means 107, connection switch means 108, and timer 109.

The alternate route processing number management means 107 manages an alternate route processing number for each connection and attaches the alternate route processing number to a LEAF SETUP REQUEST message when sending it. Further when receiving a SETUP message for alternate route, the alternate route processing number attached to the received message is compared to the stored one. If the received number is equal to or greater than the stored number, the received message is valid and the stored number is changed to the received number. As described later, when sending LEAF SETUP REQUEST message so as to find the alternate route, a larger number than the stored number is attached to the LEAF SETUP REQUEST message to be sent.

The connection switch means 108 connects the route in the direction where no fault occurs and the route secured by the SETUP message or the ADD PARTY message for alternate route. In that case, connection control is done such that the connection with the same identification number as the connection identifier of the received message is searched for and they are connected.

The timer 109 is provided to check to see whether the alternate route processing for restoration is normally performed. As will be described later, the timer 109 starts when receiving DROP PARTY/RELEASE message and stops when receiving SETUP message and the LEAF SETUP REQUEST message for restoration.

Figure 2A:
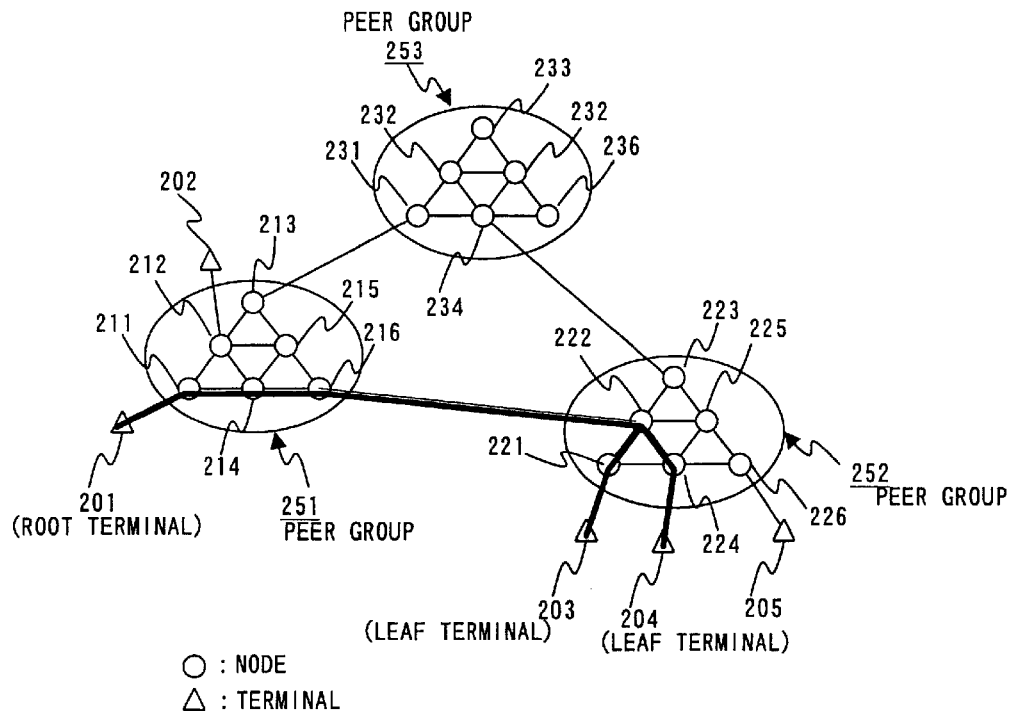
FIG. 2A is a diagram showing an example of a network for explanation of a general operation of the embodiment of the present invention.

Referring to FIG. 2A, there is shown a network including three peer groups 251–253 for the convenience of the explanation, where a peer group is a logical management unit in the PNNI protocol.

The peer group 251 is comprised of nodes 211–216 where the node 211 is connected to terminal 201 and the nodes 213 and 216 are connected to the other peer groups 253 and 252, respectively. The peer group 252 is comprised of nodes 221–226 where the node 221 is connected to terminal 203 and the nodes 222 and 223 are connected to the other peer groups 251 and 253, respectively. It is the same with the peer groups 253. Each node is provided with the functions as shown in FIG. 1.

Figure 2B:
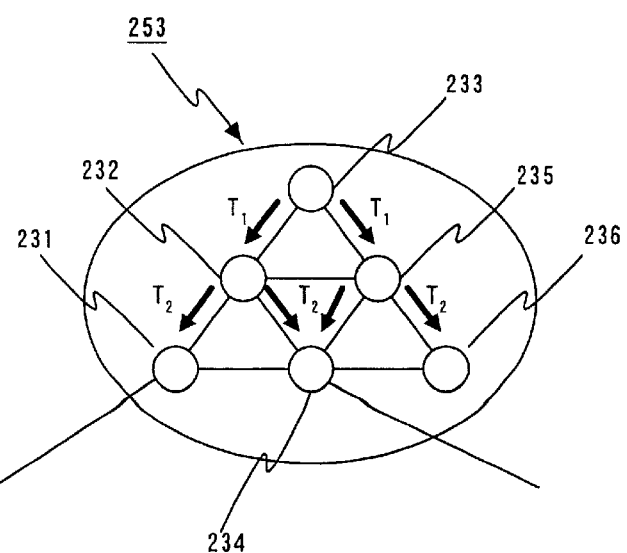
FIG. 2B is a diagram showing an example of a peer group in the network for explanation of a flooding operation of topology information in the embodiment of the present invention.

By the routing function of each node, the flooding of the network topology information is performed so that each node be aware of the current network topology of the nodes. For instance, referring to FIG. 2B, when the node 233 is aware of topology change, the topology change information is first transferred to the nodes 232 and 235 as indicated by an arrow $T_1$ and then to the nodes 231, 234 and 236 as indicated by an arrow $T_2$. As a result, the topology change information will be notified to all the nodes in the peer group 253.

To explain the network NIJ connection briefly, it is assumed that the point-to-multipoint connection is established such that the terminal 201 is connected to the terminals 203 and 204 as shown in FIG. 2A. In this case, the terminal 201 is called 'root terminal', The node 211 connected to the root terminal 201 is called 'starting point node', the terminals 203 and 204 are called 'leaf terminal', and the nodes 221 and 224 are called 'endpoint node'.

Under such a condition, in the case where another terminal (here, the terminal 205) requests the point-to-multipoint connection, the terminal 205 sends a LEAF SETUP REQUEST message to the node connected thereto (here, node 226). When receiving the LEAF SETUP REQUEST message from the terminal 205, the route computing means 104 of the node 226 computes the route to the root terminal 201 and the signaling means 102 thereof sends the LEAF SETUP REQUEST message through the computed route. A node receiving the LEAF SETUP REQUEST message determines whether the node is a proxy root node according to the predetermined algorithm as shown in FIG. 3. If the node is the proxy root node, the node sends a SETUP or ADD PARTY message back to the new leaf terminal 205 to establish the connection from the proxy root note to the new leaf terminal 205.

In the case where the node 222 which is an entry border node of the peer group 252 is chosen as the proxy root node, when receiving the LEAF SURVEY REQUEST message from the new leaf terminal 205, the proxy root node 222 computes the route to the new leaf terminal 205 and performs the connection establishment operation to the new leaf terminal 205 by sending the SETUP or ADD PARTY message. More specifically, in the case of the route from the proxy root node 222 to the leaf terminal 205: node 222—node 224—node 226, the ADD PARTY message is sent from the node 222 to the node 224 because the connection has been established between the nodes 222 and 224. Since the node 224 is a branch point to the new leaf terminal 205, the node 224 sends the SETUP message to the new leaf terminal 205 through the node 226, resulting in established connection to the leaf terminal 205.

In this manner, the LEAF SETUP REQUEST message is not sent to nodes upstream from the proxy root node 222. Since the root terminal 201 has no need to manage the new leaf terminal 205 but the first leaf terminal 203, the burden on the root terminal 201 is dramatically reduced as a result.

NODE OPERATIONS

In Network LIJ point-to-multipoint connection technique as mentioned above, the restoration method and system according to the present invention enables the route switch when a fault occurs in the point-to-multipoint connection. As will be described later, the proxy root node and the endpoint node at both ends of the route switch use the functions as shown in FIG. 1 to switch to a detour route or an alternate route which does not pass the fault-occurring route segment. Hereinafter, the following processes will be described in detail: proxy root node determination, LEAF SETUP REQUEST message reception processing, SETUP/ADD PARTY message reception processing, and RELEASE/DROP PARTY message reception processing.

It should be noted that a node connected with the link where the fault occurs sends a DROP PARTY/RELEASE message and another node which has received this message is assumed to start the timer 109.

PROXY ROOT NODE DETERMINATION

Referring to FIG. 3, when a node receives the LEAF SETUP REQUEST message or the RELEASE/DROP PARTY message, the node determines whether the node is a proxy root node or not. First, it is determined whether the node is a starting point node (step S301) and, if it is the starting point node, it is determined that it is a proxy root node (step S302).

If the node is not a starting point node (NO in step S301), it is further determined whether the node is an endpoint node and the corresponding multipoint connection transverse the node (step S303). If the conditions of the step S303 are satisified, it is determined that the node is the proxy root node (S302). If the conditions of step S303 are not satisfied, it is further determined whether the node is an entry border node of the peer group to which the node belongs on the corresponding multipoint connection (step S304).

If the condition of step S304 is met, it is further determined whether it is necessary to branch the connection in the peer group to which the node belongs (step S305). When the condition of step S305 is fulfilled, it is judged that the node is a proxy root node (step S302). If the condition of step S304 is not met or if neither the condition of the step S304 nor that of the step S305 is satisfied, then it is determined that the node is not a proxy root node (step S306). For instance, in FIG. 2A, in the case of the leaf terminal 205 doing the connection request, the entry border node 222 of the peer group 252 is chosen as a proxy root node.

MULTIPOINT CONNECTION ESTABLISHMENT

The details of connection establishment carried out by the signaling means 102 of each node will be described hereinafter.

Figure 4:
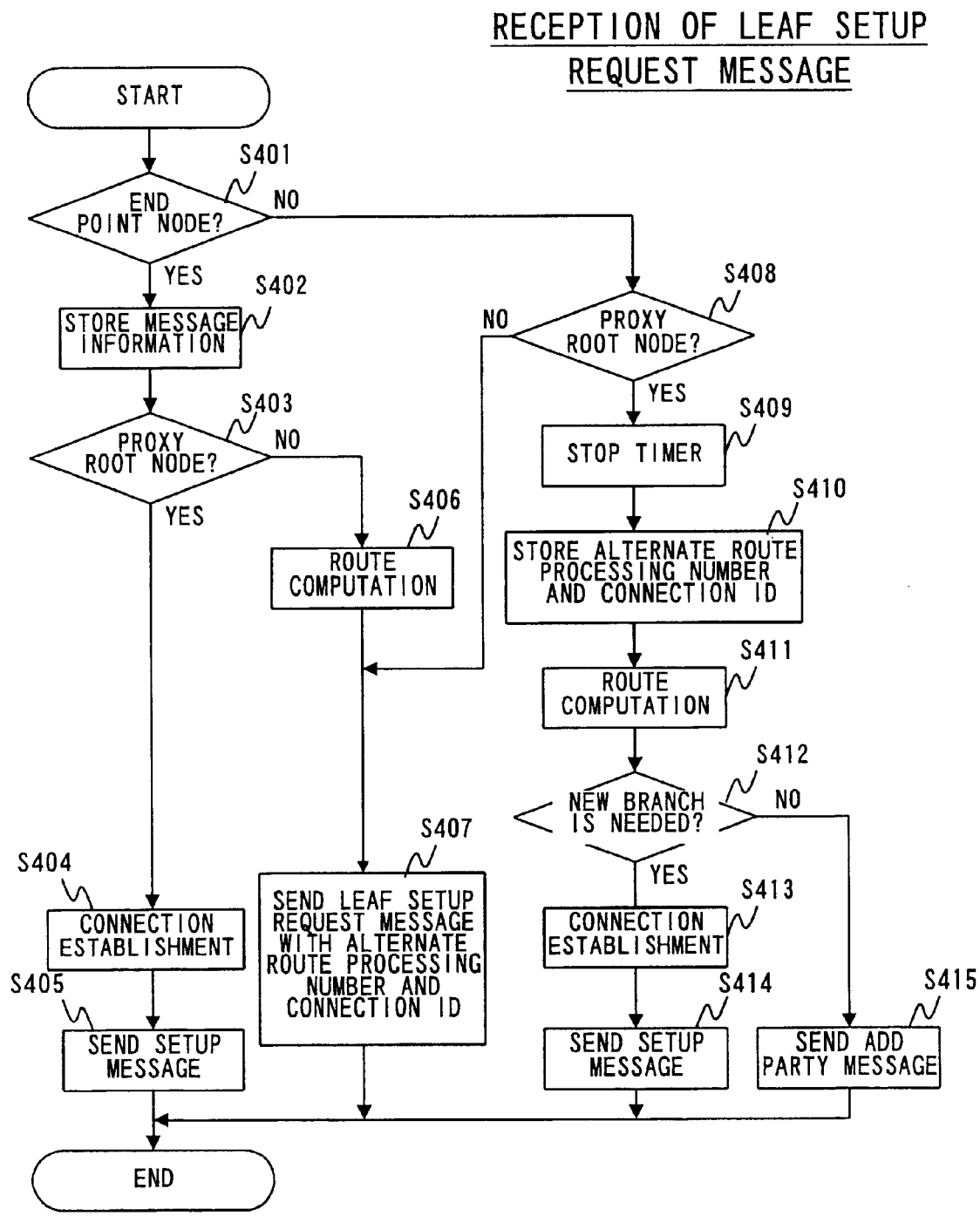
FIG. 4 is a flowchart showing an operation when a LEAF SETUP REQUEST message is received in each node.

Referring to FIG. 4, the operation of a node when receiving a LEAF SETUP REQUEST message is different depending on the role of the node in the network, that is, endpoint node, proxy root node or the like.

A node, when receiving the LEAF SETUP REQUEST message from the leaf terminal, determines whether the node is an endpoint node of the leaf terminal (step S401). If the node is an endpoint node, the information of the received LEAF SETUP REQUEST message is stored onto the message information database 106 (step S402). Subsequently, it is determined whether the node is a proxy root node (step S403) and, if it is, then the connection of the leaf terminal is established (step S403) and, if it is, then the connection to the leaf terminal is established (step S404) and sends a SETUP message to the leaf terminal (step 405).

If it is determined that the node is not a proxy root node (NO is step S403), the signaling means 102 instructs the route computing means 103 to compute the route to the root terminal based on the information of the LEAF SETUP REQUEST message and the topology information and the computed route is stored onto the route information database 105 (step S406). The signaling means 102 sends the LEAF SETUP REQUEST message to the adjacent node according to the computed route (step S407). In this case, an alternate route processing number and a connection identifier are attached to the LEAF SETUP REQUEST message in preparation for reception of plural SETUP messages for alternate route. The alternate route processing number is used to select one appropriate message from the received SETUP messages and the connection identifier is used to identify a connection to be established. The alternate route processing number is managed in each connection by the alternate route processing number management means 107.

If the node is a node other than the endpoint node of the leaf terminal (NO in step S401), it is determined whether the node is a proxy root node (step S408). If it is not a proxy root node, the LEAF SETUP REQUEST message is sent in the direction of the root terminal (step S407).

If the node is a proxy root node (YES in step S408), the timer 109 is stopped in the case where the timer 109 is working after a DROP PARTY/RELEASE message has been received (step S409). The alternate route processing number and the connection identifier of the received message are maintained (step S410). And, the signaling means 102 instructs the route comprising means 103 to compute the route to the leaf terminal based on the information of the LEAF SETUP REQUEST message (step S411).

Based on the computed route information, it is determined whether it is necessary to branch the connection at the node (step S412). If the node is a branch point, the connection to the leaf terminal is established (step S413) and the SETUP message is sent (step S414). Contrarily, if the node is not a branch point (NO of step S412), the ADD PARTY message is sent to the adjacent node (step S415).

In the case where the connection establishment using the SETUP message or the ADD PARTY message fails to be made, another route may be computed again to send the message for connection establishment. The alternate route processing number management means 107 gives a new number larger than the alternate route processing number last time to the message to be sent at this time. in the case where an endpoint node is also a proxy root node, it is not necessary to store an alternate route processing number and a connection identifier and to compute the route.

Figure 5:
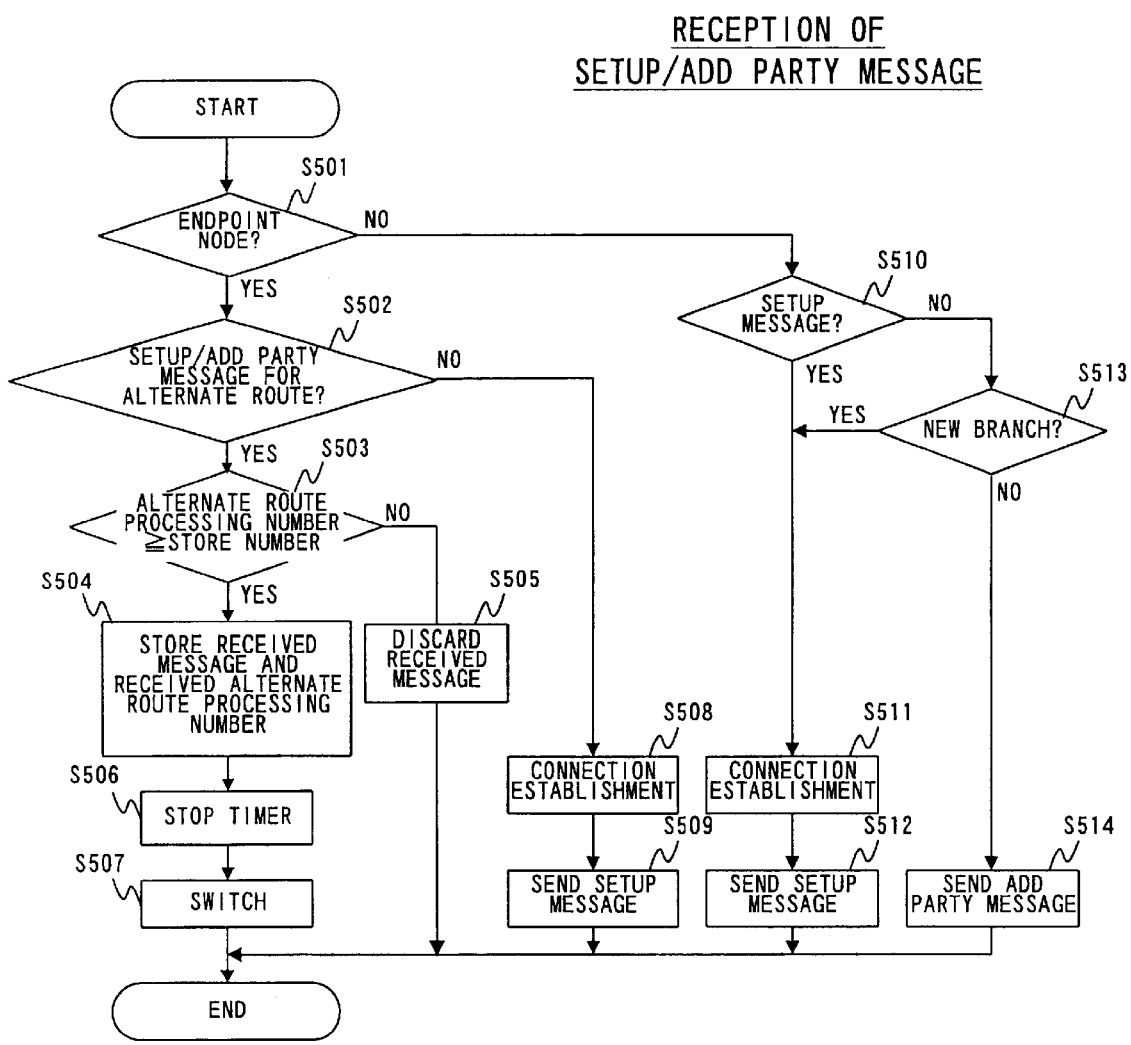
FIG. 5 is a flowchart showing an operation when a SETUP/ADD PARTY message is received in each node.

Referring to FIG. 5, the operation of a node when receiving a SETUP/ADD PARTY message is different depending on the role of the node in the network, that is, endpoint node, proxy root node or the like.

A node, when receiving the SETUP/ADD PARTY message as described above, determines whether the node is an endpoint node (step S501). If the node is an endpoint node, it is determined whether it is a SETUP/ADD PARTY message for alternate route setup (step S502).

If the SETUP/ADD PARTY message for alternate route setup is received (YES in step S502), it is further determined whether the alternate route processing number of the received message is equal to or greater than the stored alternate route processing number (step S503). If the received number is equal to or greater than the stored number (YES in step S503), it is determined that the received message is valid and the received number is stored and managed as a new alternate route processing number (step S504). Contrarily, if the received number is smaller than the stored number (NO in step S503), the received message is discarded (step S505). In this manner, each time a SETUP/ADD PARTY message with a alternate route processing number is received, one of the steps S504 and S505 is performed. At the same time, if the SETUP/ADD PARTY message for alternate route setup is received (YES in step S502), the timer 109 which is working is stopped (step S506) and the signaling means 102 instructs the switch means 108 to switch to the alternate route (step S507).

On the other hand, if the received message is not a SETUP/ADD PARTY message for alternate route setup but for initial connection (NO in step S502), the connection is established to the leaf terminal requesting the multipoint connection (step S508) and the SETUP message is sent (step S509). When the connection is established (S508), a CONNECT/ADD PARTY ACKNOWLEDGE message is sent to the root terminal or the proxy root node to complete the connection establishment process, which is not shown in FIG. 5.

If the node is not the endpoint node of the leaf terminal (NO in step S501), it is determined whether the received message is a SETUP message (step S510). If it is a SETUP message, the connection is established (step S511) and a SETUP message is sent to an adjacent node or the leaf terminal according to the route information of the received SETUP message (step S512).

On the other hand, if the received message is not a SETUP message but an ADD PARTY message (NO is step S510), it is determined whether it is necessary to branch the connection at the node (step S513). If the node is a branch point, the connection is established (step S511) and the SETUP message is sent (step S512). Contrarily, if the node is not a branch point (NO of step S513), the ADD PARTY message is sent to the adjacent node (step S514).

MULTIPOINT CONNECTION RELEASE

The release operation of multipoint connection carried out by the signaling means 102 will be described in detail.

Figure 6:
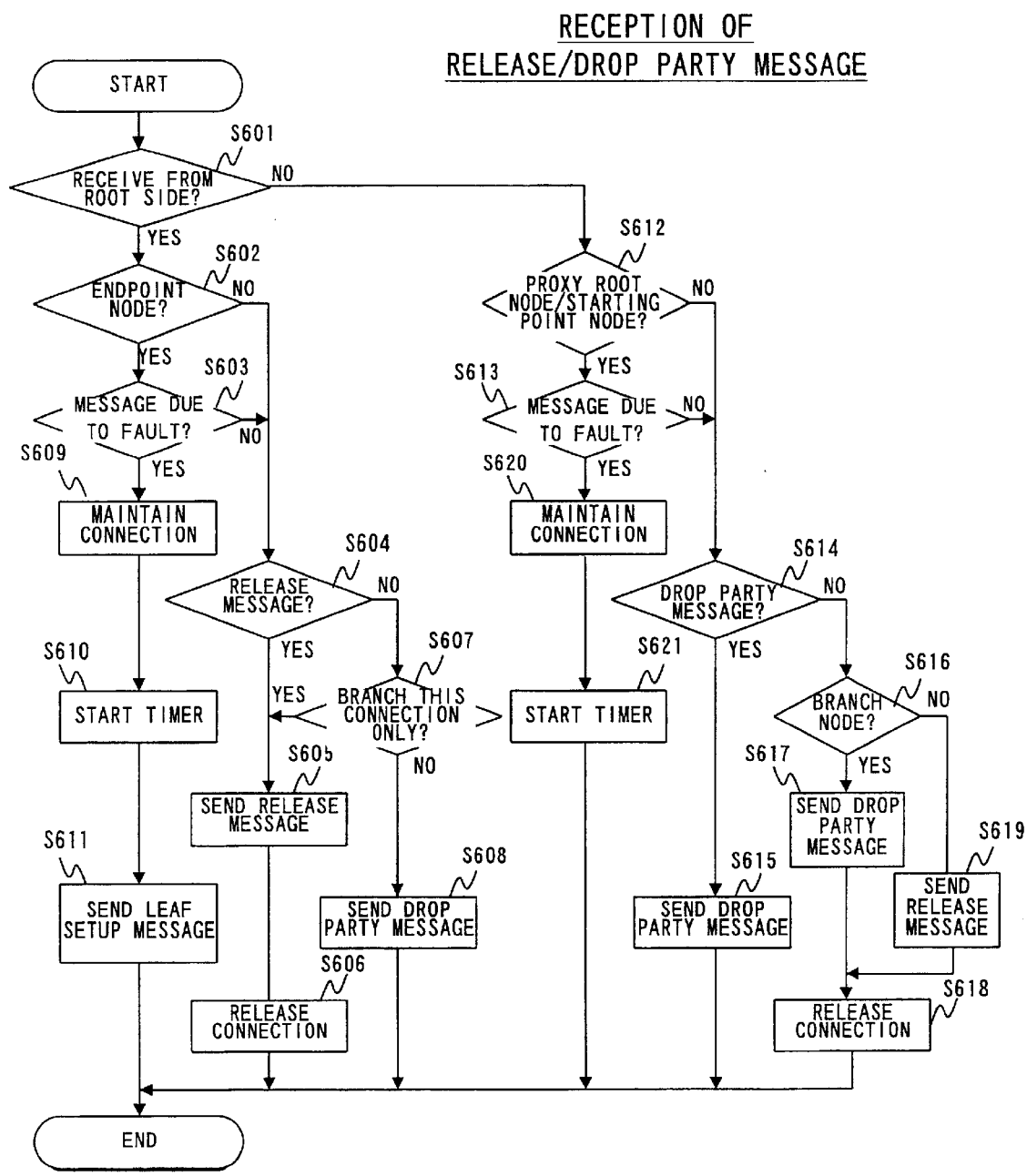
FIG. 6 is a flowchart showing an operation when a RELEASE/DROP PARTY message is received in each node.

Referring to FIG. 6, upon reception of a RELEASE/DROP PARTY message the signaling means 102 determines whether the message is received from the side of the root terminal (step S601). If it is received from the root terminal side, it is further determined whether the node is an endpoint node of a destination terminal of the received message (step S602). If is the endpoint node, it is furthermore determined whether the received message is caused by a network fault (step S603).

If the node is not the endpoint node or if it is the endpoint and is not caused by the network fault (NO in steps S602 and S630), then it is subsequently determined whether the received message is a RELEASE message (step S604). When it is the RELEASE message, that message is sent in the direction of the leaf terminal (step S605) and the connection is released (step S606). Accordingly, in the case where a message for requesting route disconnection is received from the root terminal, in other words, a received message is not caused by the network fault, the RELEASE message is sent in the direction of the leaf terminal to release the connection.

In the case where the received message is not a RELEASE message but a DROP PARTY message (NO in step S604), it is determined whether the node is a branch point and only the branched connection exists in that connection (step S607). If the condition of step S607 is satisfied, the RELEASE message is sent in the direction of the leaf terminal (step S605) and releases the connection (step S606). If the condition of step S607 is not satisfied, the DROP PARTY message is sent in the direction of the leaf terminal (step S608).

In the case where the node is the endpoint node and the network fault influencing on the connection is detected in the side of the root terminal or a RELEASE/DROP PARTY message indicating the network fault (YES in step S603), the signaling means 102 maintains the connection in the side of the leaf terminal (step S609), starts the timer 109 working (step S610), and sends a LEAF SETUP REQUEST message again in the direction of the root terminal (step S611). In this case, the signaling means 102 gives the LEAF SETUP REQUEST message the information stored in the message information database 106 which is the same as when previously sent but with the alternate route processing number greater than the stored one. Thereafter, the signaling means 102 waits for a SETUP message or an ADD PARTY message for alternate route to be received from the side of the root terminal. The operation to be performed when the SETUP/ADD PARTY message for alternate route is received is the same as shown in FIG. 5.

On the other hand, if the RELEASE/DROP PARTY message is not received from the root terminal side but from the leaf terminal side (NO of step S601), then it is determined whether the node is a proxy root node or a starting point node (step S612). When the node is a proxy root node or a starting point node, it is further judged whether the received message originates in a network fault (step S613).

If the node is neither a proxy root node nor a starting point node or if it is one of a proxy root node and a starting point node and is not caused by the network fault (NO in steps S612 and S613), then it is subsequently determined whether the received message is a DROP PARTY message (step S614). When it is the DROP PARTY message, that message is sent in the direction of the leaf terminal (step S615). If the received message is not a DROP PARTY message but a RELEASE message (NO in step S614), it is further determined whether the node is a branch point (step S616). If the node is a branch point, the DROP PARTY message is sent in the direction of the root terminal (step S617) and the connection is released in the side of the leaf terminal (step S618). If the node is not a branch point (NO in the step S616), the RELEASE message is sent in the direction of the root terminal (step S619) and the connection is released (step S618).

In the case where the node is one of a proxy root node and a starting point node and the network fault influencing on the connection is detected in the side of the leaf terminal or a RELEASE/DROP PARTY message indicating the network fault (YES in step S613), the signaling means 102 maintains the connection in the side of the root terminal (step S620), starts the timer 109 working (step S621), and waits for a LEAP SETUP REQUEST message for alternate route re-establishment to be received from the side of the endpoint node. The operation to be performed when a message for disconnection is received in conditions other than the above mentioned condition is the same as the disconnection operation requested by a terminal.

EXAMPLE 1

Figure 7:
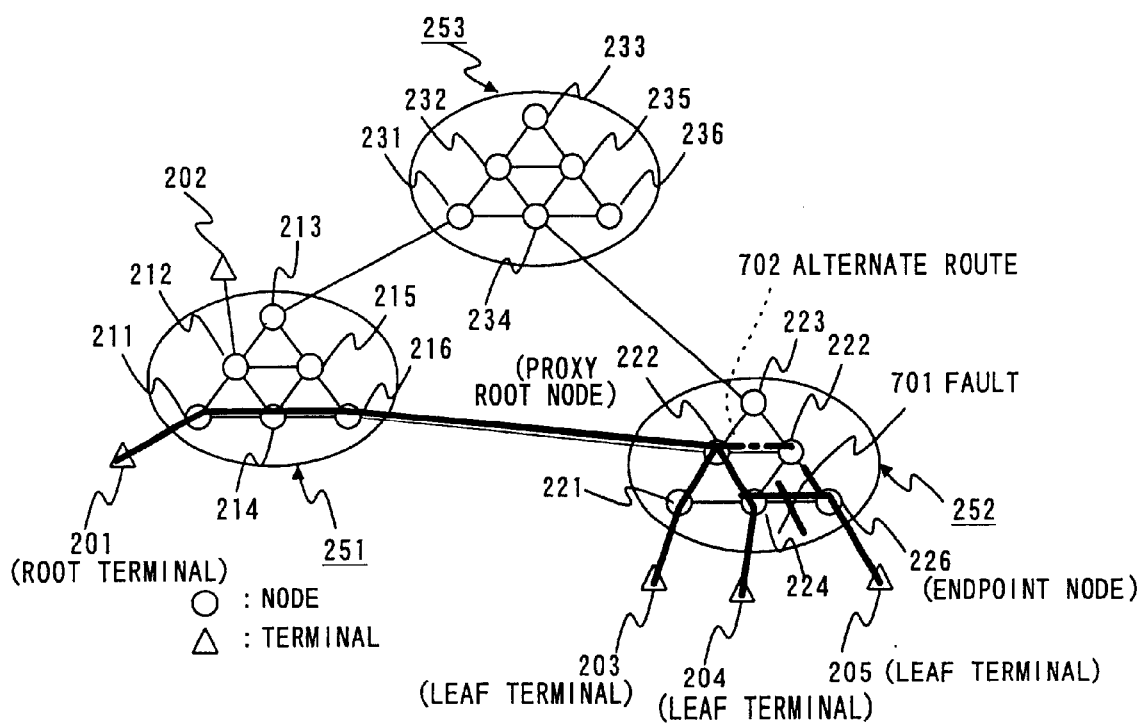
FIG. 7 is a diagram showing a first example of an alternate route.

Referring to FIG. 7, the terminal 201 connected to the node 211 in the peer group 251 is a root terminal, the respective terminals 203 and 204 connected to the nodes 221 and 224 and the terminal 205 connected to the node 226 are a leaf terminal. These leaf terminals 203–205 have already participated in the point-to-multipoint connection. Only the leaf terminal 203 is connected by the root terminal 201 and the node 211 is a proxy root node for the leaf terminal 203. Assuming that the node 222 is a proxy root node for the leaf terminals 204 and 205, these leaf terminals 204 and 205 are managed by the node 222.

In such a configuration, when a fault 701 occurs on a link between the nodes 224 and 226, the route switch is carried out by between the proxy root node 222 and the endpoint node 226 to form an alternate route 702 via the node 225. The details will be described hereinafter.

Figure 8:
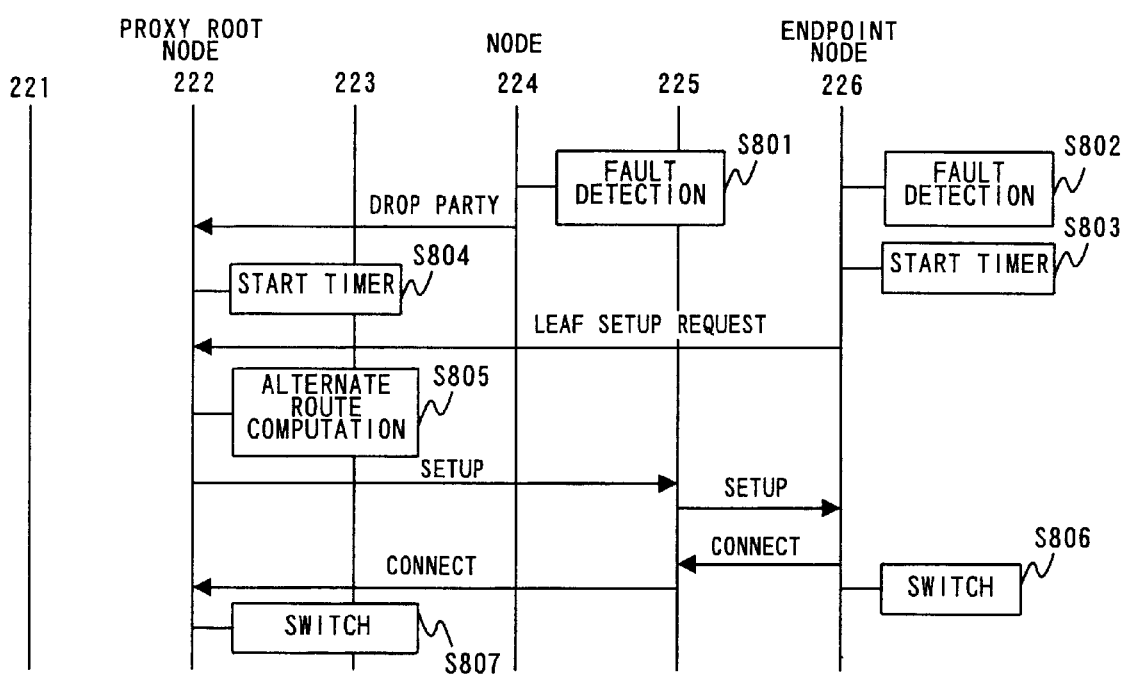
FIG. 8 is a sequence diagram showing route switching operation of the first example shown in FIG. 7.

Referring to FIG. 8, when the fault 701 occurs on a link between the nodes 224 and 226, the nodes 224 and 226 initially detect the fault 701 (steps S801 and S802). Since the node 226 is an endpoint node, the connection to the leaf terminal 205 is maintained and the timer 109 is started (step S803). Further, a LEAF SETUP REQUEST message is generated based on the message information database 106 with changing only an alternate route processing number.

On the other hand, the node 224 is not a proxy root node and detects the fault 701 in the leaf terminal. Further, the node 224 has the connection to the terminal 204. Therefore, the node 224 sends a DROP PARTY message in the direction of the root terminal 201, that is, to the node 222.

When receiving the DROP PARTY message from the leaf terminal, the node 222 which is a proxy root node, as shown in steps S620 and S621 of FIG. 6, maintains the connection in the side of the root terminal, starts the timer 109 working (step S804), and waits for a LEAF SETUP REQUEST message to be received from the side of the endpoint node. When receiving the LEAF SETUP REQUEST message from the side of the endpoint node, the signaling means 102 stops the timer 109. After an alternate route processing number and a connection identifier of the received LEAF SETUP REQUEST message are maintained, the node 222 computes the route to the endpoint node (step S805: steps S409–S411 of FIG. 4).

In the case of the computed route: node 222—node 225—node 226, the signaling means 102 of the node 222 attaches the stored alternate route processing number and connection identifier to a SETUP message for alternate route and then sends it to the adjacent node 225 (steps S412–S414 of FIG. 4). Upon reception of the SETUP message for alternate route, the node 225 performs the connection establishment and then further sends the SETUP message for alternate route to the adjacent node 226 (steps S510–S512 of FIG. 5).

In the endpoint node 226, when receiving a message having the same connection identifier and an alternate route processing number larger than the stored number, the timer 109 is stopped and the route switch is performed to connect a new route through which the message is received to the maintained connection to the leaf terminal 205 (steps S806: steps S502–S507 of FIG. 5). Thereafter, a CONNECT message is sent through the same new route in the direction of the root terminal. When receiving the CONNECT message, the proxy root node 222 performs the route switch (step S807) to connect it to the maintained connection to the root terminal 201. In this manner, the alternate route switching process is completed.

EXAMPLE 2

Figure 9:
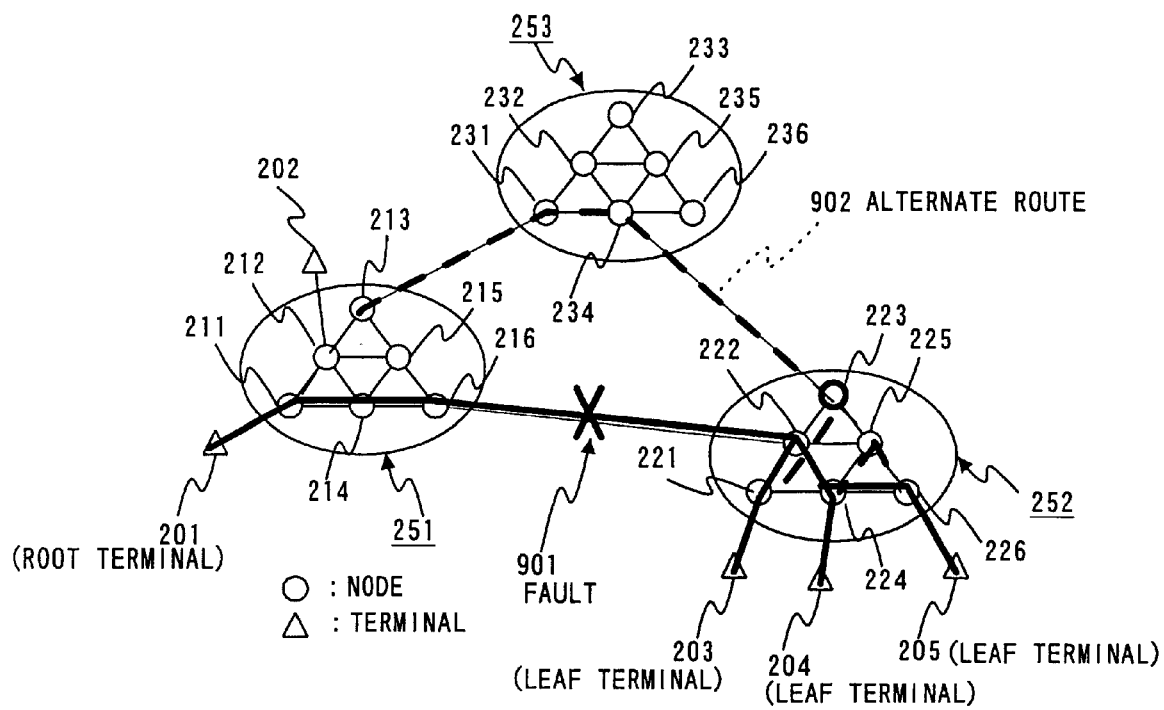
FIG. 9 is a diagram showing a second example of an alternate route.

Referring to FIG. 9, it is assumed that a fault 901 occurs on a link between the node 216 of the peer group 251 and the node 222 of the peer group 252. In other words, the fault 901 occurs at a location upstream from the proxy root node of the leaf terminals 204 and 205. In this case, how the route is restored will be described hereinafter.

Figure 10:
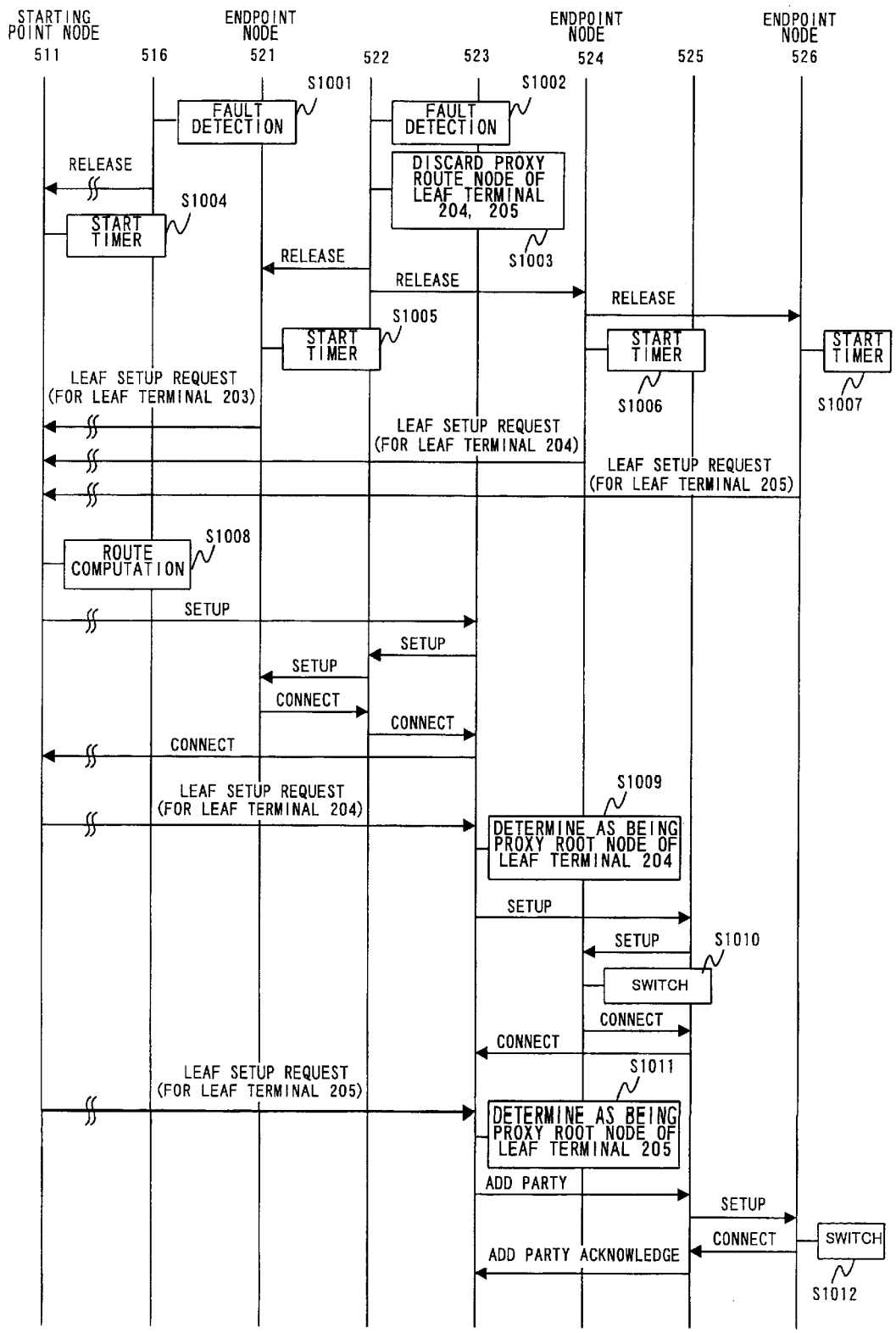
FIG. 10 is a sequence diagram showing route switching operation of the second example shown in FIG. 9.

Referring to FIG. 10, when the fault 901 occurs on a link between the nodes 216 and 222, the nodes 216 and 222 initially detect the fault 901 (steps S1001 and S1002). The node 222 has not been a proxy root node because the connection cannot be used due to the fault 901. Therefore, a RELEASE message caused by the fault 901 is sent in the direction of each leaf terminal having the connection and finally to the endpoint nodes 221, 224 and 226.

Each of the endpoint nodes 221, 224 and 226 maintains the connection to leaf terminal side, starts the timer 109 (steps S1005–S1007), and sends a LEAF SETUP REQUEST message which is given a connection identifier and an alternate route processing number greater than the stored one managed by the alternate route processing number management means 107 (see steps S609–S611 of FIG. 6).

On the other hand, since the node 216 is a traversed node, a RELEASE message is sent in the direction of the root terminal and finally to the starting point node 211 which is a proxy root node of the leaf terminal 203. The node 211 starts the timer 109 (step S1004) and waits for a LEAF SETUP REQUEST message for the leaf terminal 203 to be received.

When receiving the LEAF SETUP REQUEST message for the leaf terminal 203, the starting point node 211 stops the timer 109, computes the route to the leaf terminal 203 (step S1008), and sends a SETUP message according to the computed route (see steps S408–414 of FIG. 4). The SETUP message is transferred from one node to another (here, through the route: node 231—node 234—node 233—node 222) and then reaches the endpoint node 221. At the endpoint node 221, it is checked to see that it is a SETUP message for alternate route based on the connection identifier and the alternate route processing number of the received message. If the received message is the SETUP message for alternate route, the timer 109 is stopped and a CONNECT message is sent back (see steps S501–S507 of FIG. 5).

The starting point node 211 also receives LEAF SETUP REQUEST messages for the leaf terminals 204 and 205. Since these terminals 204 and 205 belong to the same peer group 252 as the leaf terminal 203 which has been already managed, it is determined that there is no need to branch in the peer group 251 and the node 211 sequentially sends back the LEAF SETUP REQUEST messages for the leaf terminals 204 and 205 through the same route as the case of the leaf terminal 203.

The node 223 which is an entry border node of the peer group 252, when receiving the LEAF SETUP REQUEST message for the leaf terminal 204, determines that the node 223 itself is a proxy root node of the leaf terminal 204 (step S1009), computes the route to the endpoint node 224, and sends a SETUP message according to the computed route (see steps S408–S414 of FIG. 4). This setup message is transferred through the node 225 to the endpoint node 224. At the endpoint node 224, it is checked to see that it is a SETUP message for alternate route based on the connection identifier and the alternate route processing number of the received message. If the received message is the SETUP message for alternate route, the timer 109 is stopped, the route switch to the alternate route is performed, and a connect message is sent back to establish the connection (step S1010: steps S501–S507 of FIG. 5).

Similarly, when receiving the LEAF SETUP REQUEST message for leaf terminal 205, the node 223 determined that the node 223 itself is a proxy root node of the leaf terminal 205 (step S1011) and compute the route to the endpoint node 226. In this case, since the connection has been already established from the node 223 to the node 225, the node 223 sends an ADD PARTY message to the node 225 (see steps S408–S412, S415 of FIG. 4).

When receiving the ADD PARTY message from the node 223, the node 225 sends a SETUP message to the endpoint node 226 because a new branch of the connection is needed (see steps S501, S510, S513 and S511 of FIG. 5). At the endpoint node 226, it is checked to see that it is a SETUP message for alternate route based on the connection identifier and the alternate route processing number of the received message. If the received message is the SETUP message for alternate route, the timer 109 is stopped, the route switch to the alternate route is performed, and a CONNECT message is sent back (step S1012: steps S501–S507 of FIG. 5). When receiving the CONNECT message, the node 225 sends and ADD PARTY ACKNOWLEDGE message back to the node 223 to establish the connection from the entry border node 223 to the endpoint node 226. In this manner, even in the case of the fault 901 occurring, by switching to the detour or alternate route 902, the connections to the leaf terminals 203–205 can be restored.

As described above, according to the restoration method and system, when receiving a connection release message caused by a fault from root terminal side, a connection request message is sent to the network while maintaining the connection to leaf terminal side to establish an alternate route. Therefore, automatic restoration can be achieved even in the point-to-multipoint connection configuration.

What is claimed is:

1. A restoration method in a connection-oriented network where a point-to-multipoint connection is formed between a terminal which is a sending side of the connection (hereinafter, called root terminal) and a plurality of terminals which are a receiving side of the connection (hereinafter, called plural leaf terminals) through a plurality of nodes of the network and the point-to-multipoint connection is established and managed in the network without only dependence on the root terminal, comprising the steps of:

at a first node of the nodes, determining whether a connection release message caused by a fault of the network is received from a node on the root terminal side of the first node after a first connection to one of the plural leaf terminals has been established in response to a first connection request message received from the one leaf terminal;

maintaining the first connection to the one leaf terminal when the connection release message is received from a node on the root terminal side of the first node;

sending a second connection request message to the network and waiting for a connection message for restoration to be received from the network in response to the second connection request message; and switching a route by connecting the first connection to a second connection determined by the connection message for restoration received from the network.

2. The restoration method according to claim 1, further comprising the steps of:

starting a timer when receiving the connection release message caused by the fault; and stopping the timer when receiving the connection message for restoration.

3. The restoration method according the claim 1, wherein the first node is an endpoint node which is a node directly connected to one of the plural leaf terminals.

4. The restoration method according to claim 3, wherein the second connection request message to be sent to the network is given a determination number and a connection identifier, wherein the determination number is used to determine whether the connect message for restoration is acceptable and the connection identifier is used to identify the first connection.

5. The restoration method according to claim 1, further comprising the steps of:

at a second node located upstream from the first node, determining whether the connection release message caused by the fault is received from a node of the one leaf terminal;

maintaining a third connection to the root terminal when the connection release message is received from a node of the one leaf terminal;

sending the connection message for restoration to the one leaf terminal when receiving the second connection request message from the first node; and switching a route by connecting the third connection to the second connection determined by the connection message for restoration after the second connection has been established.

6. The restoration method according to claim 5, wherein the second node is a proxy root node which is determined according to a predetermined procedure, wherein the proxy root node performs establishment and management of part of the point-to-multipoint connection as a substitute for the root terminal.

7. The restoration method according to claim 5, further comprising the steps of:

starting a timer when receiving the connection release message caused by the fault; and stopping the timer when receiving the connection request message from the first node.

8. A restoration method in a connection-oriented network wherein a point-to-multipoint connection is formed between a terminal which is a sending side of the connection (hereinafter, called root terminal) and a plurality of terminals which are a receiving side of the connection (hereinafter, called plural leaf terminals) through a plurality of nodes of the network, wherein the point-to-multipoint connection is established and managed by at least one node (hereinafter, called proxy root node) which is determined according to a predetermined procedure, comprising the steps of:

maintaining a first connection from a proxy root node affected by a fault of the network to the root terminal when the fault is detected in the point-to-multipoint connection;

maintaining a second connection from an endpoint node to one of the leaf terminals, wherein the endpoint node is directly connected to the one leaf terminal affected by the fault;

establishing an alternate route between the proxy root node affected by the fault and the endpoint node in response to a connection request sent by the endpoint node; and connecting the alternate route to the first connection and the second connection at the proxy root node and the end point node, respectively.

9. The restoration method according to claim 8, further comprising the steps of:

at the endpoint node, determining whether a connection release message caused by the fault is received from a node of the root terminal after the second connection to the one leaf terminal has been established in response to a first connection request message received from the one leaf terminal;

maintaining the second connection to the one leaf terminal when the connection release message is received from a node of the root terminal;

sending a second connection request message to the network and waiting for a connection message for restoration to be received from the network in response to the second connection request message; and switching a route by connecting the second connection to the alternate route determined by the connection message for restoration received from the network.

10. The restoration method according to claim 9, further comprising the steps of:

at the proxy root node, determining whether the connection release message caused by the fault is received from a node of the one leaf terminal;

maintaining the first connection to the root terminal when the connection release message is received from a node of the one leaf terminal;

sending the connection message for restoration to the one leaf terminal when receiving the second connection request message from the endpoint node; and switching a route by connecting the first connection to the alternate route determined by the connection message for restoration.

11. The restoration method according to claim 9, further comprising the steps of:

at the endpoint node, starting a timer when receiving the connection release message caused by the fault; and stopping the timer when receiving the connection message for restoration.

12. The restoration method according to claim 9, wherein the second connection request message to be sent to the network is given a determination number and a connection identifier, wherein the determination number is used to determine whether the connect message for restoration is acceptable and the connection identifier is used to identify the first connection.

13. The restoration method according to claim 10, further comprising the steps of:

at the proxy root node, starting a timer when receiving the connection release message caused by the fault; and stopping the timer when receiving the connection request message from the endpoint node.

14. A restoration system in a connection-oriented network where a point-to-multipoint connection is formed between a terminal which is a sending side of the connection (hereinafter, called root terminal) and a plurality of terminals which are a receiving side of the connection (hereinafter, called plural leaf terminals) through a plurality of nodes of the network and the point-to-multipoint connection is established and managed in the network without only dependence on the root terminal, wherein a node directly connected to one of the leaf terminals (hereinafter, called endpoint node) comprises:

a storage for storing a connection request message received from the one leaf terminal;

a first controller for determining whether a connection release message caused by a fault of the network is received from a node of the root terminal after a first connection to the one leaf terminal has been established in response to a first connection request message received from the one leaf terminal, maintaining the first connection to the one leaf terminal when the connection release message is received from a node of the root terminal, and sending a second connection request message to the network to wait for a connection message for restoration to be received from the network in response to the second connection request message; and first switch for switching a route by connecting the first connection to a second connection determines by the connection message for restoration received from the network.

15. The restoration system according to claim 14, wherein the endpoint node further comprises:

a timer which starts working when receiving the connection release message caused by the fault, and stops working when receiving the connection message for restoration.

16. The restoration system according to claim 14, wherein the first controller gives a determination number and a connection identifier to the second connection request message to be sent to the network, wherein the determination number is used to determine whether the connect message for restoration is acceptable and the connector identifier is used to identify the first connection.

17. The restoration system according to claim 14, further comprising:

a proxy root node which is determined according to a predetermined procedure, wherein the proxy root node performs establishment and management of part of the point-to-multipoint connection as a substitute for the root terminal, the proxy root node comprising:

a second controller for determining whether the connection release message caused by the fault is received from a node of the one leaf terminal, maintaining a third connection to the root terminal when the connection release message is received from a node of the one leaf terminal, and sending the connection message for restoration to the one leaf terminal when receiving the second connection request message from the first node; and a second switch for switching a route by connecting the third connection to the second connection determined by the connection message for restoration after the second connection has been established.

18. The restoration system according to claim 17, wherein the proxy root node further comprises:

a timer which starts working when receiving the connection release message caused by the fault, and stops working when receiving the connection request message from the endpoint node. connection message for restoration.

* * * * *